United States Patent [19]
Poisner

[11] Patent Number: 6,014,758
[45] Date of Patent: Jan. 11, 2000

[54] METHOD AND APPARATUS FOR DETECTING AND REPORTING FAILED PROCESSOR RESET

[75] Inventor: David I. Poisner, Folsom, Calif.

[73] Assignee: Intel Corporation, Santa Clara, Calif.

[21] Appl. No.: 08/935,115

[22] Filed: Sep. 18, 1997

[51] Int. Cl.[7] .............................. G06F 15/00; G06F 11/00
[52] U.S. Cl. .............................................. 714/36; 714/736
[58] Field of Search ........................ 395/182.21, 185.08, 395/185.06; 714/23, 55, 53, 36, 736, 25

[56] References Cited

U.S. PATENT DOCUMENTS

| | | | |
|---|---|---|---|
| 4,303,986 | 12/1981 | Lans | 345/431 |
| 4,594,685 | 6/1986 | Owens | 395/182.21 |
| 4,763,296 | 8/1988 | Gercekci | 395/185.08 |
| 4,809,280 | 2/1989 | Shonaka | 395/185.08 |
| 5,249,188 | 9/1993 | McDonald | 395/185.06 |
| 5,513,319 | 4/1996 | Finch et al. | 395/185.08 |
| 5,530,946 | 6/1996 | Bouvier et al. | 395/182.21 |
| 5,535,405 | 7/1996 | Byers et al. | 395/290 |

*Primary Examiner*—Ly V. Hua
*Attorney, Agent, or Firm*—Calvin E. Wells

[57] ABSTRACT

A reset signal is asserted to a processor. In response to the reset signal, the processor normally performs an instruction fetch cycle to a predetermined address. If the processor fails to perform the instruction fetch cycle or fails to perform the fetch cycle to the predetermined address within a predetermined period of time, an indication is provided that the processor reset has failed.

14 Claims, 2 Drawing Sheets

METHOD AND APPARATUS FOR DETECTING AND REPORTING FAILED PROCESSOR RESET

RELATED APPLICATIONS

Reference is made to the following commonly assigned copending patent applications:

Ser. No. 08/933,260, entitled "Method and Apparatus for Detecting and Recovering From Computer System Malfunction"; and Ser. No. 08/933,629, entitled "Method and Apparatus for Reporting Malfunctioning Computer System", each of which is incorporated by reference herein.

BACKGROUND OF THE INVENTION

1. Field of the Invention

The present invention pertains to the field of computer systems. More particularly, this invention pertains to the field of detecting and reporting a failed processor reset.

2. Background of the Related Art

For many years, computer system manufacturers, computer component manufacturers, and computer users have been concerned with detecting and recovering from computer system malfunctions. Processors failing to reset or failing to reset properly is a particularly serious computer system failure. A failure to reset is a clear indication that the processor is not functioning properly. A computer system cannot function at all if its processor fails to reset. A failure to reset may have several causes, including improper processor installation or a broken processor. The processor may become broken due to electro-static discharge (ESD), mechanical stress, etc.

Many of today's computer systems allow the consumer to replace or upgrade processors. There is a possibility that the consumer will make a mistake when installing a processor which will result in the system failing to function. In prior systems, if the processor fails to function, the user receives no indication that a problem exists other than a blank computer display screen or other such indication. Further, for computer systems that are part of a network, the network administrators receive no notice that a problem exists. Therefore, a method and apparatus for detecting and reporting a failed processor reset is desirable.

A computer system may also malfunction as a result of a missing or malfunctioning non-volatile memory device which contains the computer system's Basic Input/Output System (BIOS) even if the processor is operating correctly. Therefore, a method and apparatus for detecting and reporting a missing or malfunctioning non-volatile memory device is also desirable.

SUMMARY OF THE INVENTION

A method and reporting a failed processor reset is disclosed. A reset signal is asserted to a processor. An indication is provided that the processor reset has failed if the processor fails to perform an instruction fetch cycle to a predetermined address whithin a predetermined period of time.

DETAILED DESCRIPTION

A method and apparatus for detecting and reporting a failed processor reset is disclosed. In the following description, for the purposes of explanation, specific details are set forth to provide a thorough understanding of the invention. However, it will be apparent to one skilled in the art that these specific details are not required to practice the invention. In other instances, well known methods, devices, and structures are not described in particular detail in order to avoid obscuring the invention.

Overview

The invention solves the problem of detecting and reporting a failed processor reset. In general, and in accordance with one embodiment of the invention, a reset signal is asserted to a processor. In response to the reset signal, the processor normally performs an instruction fetch cycle to a predetermined address. An indication is provided that the processor reset has failed if the processor fails to perform an instruction fetch cycle to the predetermined address within a predetermined period of time.

Embodiments of the Invention

Figure 1:
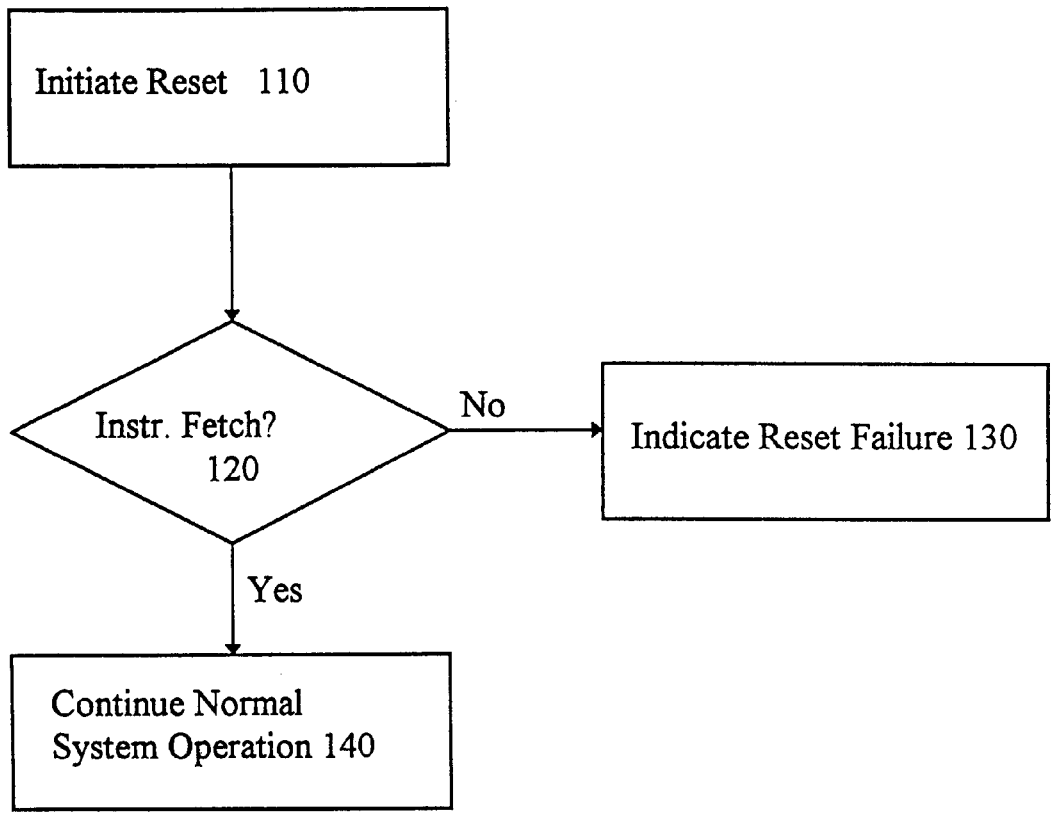
FIG. 1 shows a flow diagram of a method for detecting and reporting a failed precessor reset implemented in accordance with one embodiment of the invention.

FIG. 1 shows a flow diagram of a method for detecting and reporting a failed processor reset implemented in accordance with one embodiment of the invention. At step 110, a processor reset is initiated. The reset is typically initiated by system logic within a computer system that asserts a reset signal to various devices in the system, including the processor. The reset signal is generally asserted in response to power being initially applied to the system or a computer system user pushing a "reset" button usually located on the computer system chassis. In response to the assertion of the reset signal, the processor enters a predetermined initial state, and then begins to fetch instructions for execution. The first instruction fetch cycle initiated by the processor in response to the reset signal is to a predetermined memory address location. This memory address location typically resides in a non-volatile memory device containing the computer system's BIOS. Since the address for the first instruction fetch cycle is known, it is possible to check for that instruction fetch cycle, and if that cycle is not found, to take certain actions.

Step 120 indicates that a check is made to determine whether the first instruction fetch occurs. The checking may be implemented by starting a timer or counter upon resetting the processor and determining that the first instruction fetch failed to occur if an instruction fetch cycle to the known first instruction address is not issued by the processor within a predetermined period of time. Any technique or method for determining whether the first instruction fetch occurs to the known first instruction address may be practiced with the invention. Further, although the present embodiment determines whether a first instruction fetch cycle to a known first instruction address issues within a predetermined period of time, it is possible to practice this invention by determining whether any instruction fetch cycle issues to any known instruction address. Thus, a determination that a second, third, or any other instruction fetch cycle issues to a second, third, or any other instruction address within a predetermined period of time is possible.

If the first instruction fetch cycle is determined to have occurred within the predetermined period of time, system operation continues in normal fashion, as depicted at step 140.

If it is determined at step 120 that the first instruction fetch cycle failed to occur within the predetermined period of time, then an indication is made at step 130 that the reset failed. The indication can be made using any technique for alerting the computer user or, if the computer system is connected to a network, the network administrators. One technique for indicating a failed reset includes causing a light, possibly a light-emitting diode, to flash, change color, become illuminated, or otherwise convey to the computer system user that the reset failed. Another technique includes causing an audio device to deliver an audible tone or message to the user that the reset failed. One other possible technique for alerting the computer system user or network administrators includes causing a communications device within the computer system to deliver a message over a computer network indicating that the reset failed. These various techniques can prompt the user or network administrator to take actions to correct the indicated malfunction. These actions may include checking for proper processor installation and/or replacing the processor.

In addition to or as a substitution for determining whether the first instruction fetch cycle occurs to a predetermined address within a predetermined period of time, it is possible to check the information returned by the memory device that is the target of the first instruction fetch cycle. The returned information can be checked to determine if it matches a predetermined value. If the information does not match, it could be an indication that the instruction fetch was made to an improper address, that an address, data, or control path between the processor and the memory device is broken, that the memory device contains invalid information, or the memory device is missing. Many computer systems have the non-volatile memory devices installed in sockets which allows the possibility of missing devices due to assembly errors or due to memory devices falling out of the socket.

Figure 2:
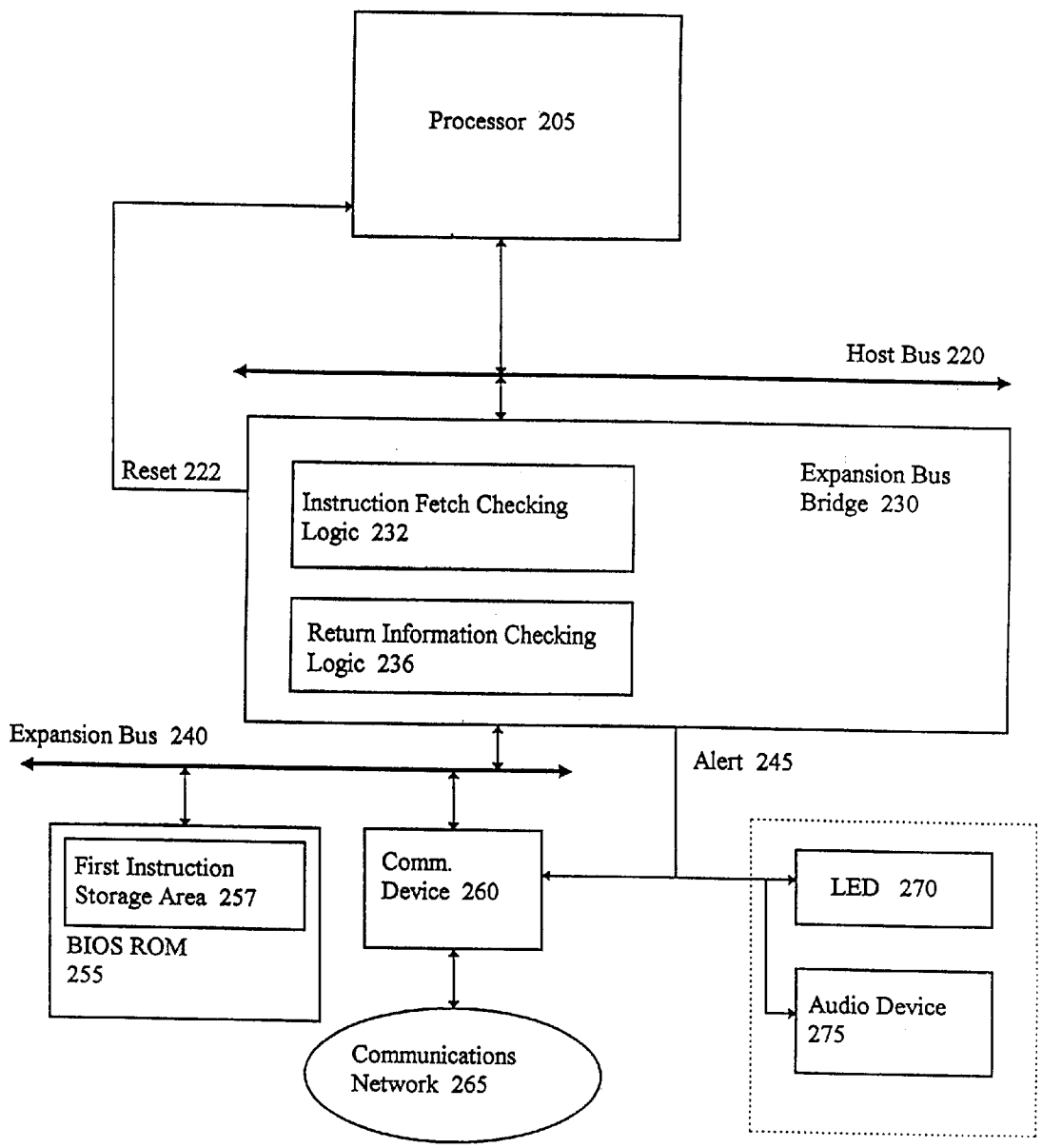
FIG. 2 depicts a black diagram of computer system implemented in accordance with one embodiment of the invention.

FIG. 2 depicts a block diagram of a computer system 200 implemented in accordance with one embodiment of the invention. The computer system 200 typically includes a host bus 220 for communicating information, such as instructions and data. The system further includes a processor 205, coupled to the host bus 220, for processing information according to programmed instructions.

The processor 205 could be an 80960, 386, 486, Pentium® processor, Pentium® Pro processor, or Pentium® II processor made by Intel Corp., among others, including processors that are compatible with those listed above.

An expansion bus bridge 230 couples the host bus 220 to an expansion bus 240. Devices coupled to the expansion bus 240 include a BIOS read-only memory (BIOS ROM) 255, and a communications device 260 that serves to couple the computer system 200 to a communications network 265. The BIOS ROM 255 includes a first instruction storage area 257.

The expansion bus bridge 230 includes an instruction fetch checking logic 232 and, optionally, a return information checking logic 236. The instruction fetch checking logic 232 and the return information checking logic 236 are not restricted to being included in the expansion bus bridge, but may be located elsewhere in the computer system 200.

A reset signal 222 is coupled between the expansion bus bridge 230 and the processor 205. Upon system start-up, or when a reset button (not shown) is pushed by a computer system 200 user, or when any other mechanism for requesting a processor reset is invoked, the reset signal 222 is asserted to the processor 205. In response to the reset signal 222, the processor 205 is placed in a known initial state. Also in response to the reset signal, the instruction fetch checking logic begins to look for a first instruction fetch cycle to issue from the processor 205. The instruction fetch checking logic 232 expects the processor to issue the first instruction fetch cycle to a particular, predetermined address within a predetermined period of time. The predetermined period of time may be determined by a timer or counter within the instruction fetch checking logic 232 that is loaded in response to the assertion of the reset signal 222. The predetermined address corresponds to the first instruction storage area 257.

If the instruction fetch checking logic 232 does not see the first instruction fetch cycle to the predetermined address within a predetermined period of time, the instruction fetch checking logic causes an alert signal 245 to be asserted. The alert signal 245 is coupled to the communications device 260, and is also optionally coupled to a light-emitting diode (LED) 270 and/or an audio device 275. In response to the assertion of the alert signal 245, the communications device causes a message to be delivered across the communications network 265 that indicates that the reset failed. The LED 270 may be made to illuminate, blink, change color, or otherwise indicate that the reset failed. The audio device 275 can be made to beep or to otherwise provide an aural indication that the reset failed.

Alternatively, the alert signal 245 can be asserted in response to the return information checking logic 236 if the return information checking logic determines that incorrect information is returned from the first instruction storage area 257 in response to an instruction fetch cycle.

It will be clear to one skilled in the art that the invention can operate upon a wide range of programmable computer systems, not just the example computer system 200.

In the foregoing specification the invention has been described with reference to specific exemplary embodiments thereof It will, however, be evident that various modifications and changes may be made thereto without departing from the broader spirit and scope of the invention as set forth in the appended claims. The specification and drawings are accordingly to be regarded in an illustrative rather than in a restrictive sense.

What is claimed is:

1. A method for detecting and reporting that a reset of a processor has failed, the method comprising the steps of:

issuing a reset signal to the processor;

determining whether the processor fails to issue a first instruction fetch cycle within a predetermined period of time after the reset of the processor, the first instruction fetch cycle including a first instruction address;

determining whether the first instruction address matches a predetermined address;

indicating that the reset has failed if the first instruction fetch cycle is not issued from the processor within the predetermined period of time; and indicating that the reset has failed if the first instruction fetch address does not match the predetermined address.

2. The method of claim 1 wherein the step of indicating that the reset has failed if the first instruction fetch cycle is not issued from the processor within the predetermined period of time further includes the steps of:

starting a timer upon performing the step of issuing a reset signal to the processor; and indicating that the reset has failed if the timer expires before the first instruction fetch is issued from the processor.

3. The method of claim 1 wherein the step of indicating that the reset has failed if the first instruction fetch cycle is not issued from the processor within the predetermined period of time further includes the steps of:

asserting an alert signal to a communications device; and transmitting information across a communications network indicating that the reset has failed.

4. The method of claim 1 wherein the step of indicating that the reset has failed if the first instruction fetch cycle is not issued from the processor within the predetermined period of time further includes the step of providing an aural indicator that the reset has failed.

5. The method of claim 1 wherein the step of indicating that the reset has failed if the first instruction fetch cycle is not issued from the processor within the predetermined period of time further includes the step of providing a visual indicator that the reset has failed.

6. The method of claim 5, wherein the step of providing a visual indicator includes the step causing a light-emitting diode to illuminate.

7. The method of claim 5, wherein the step of providing a visual indicator includes the step causing a light-emitting diode to blink periodically.

8. A method for detecting and reporting that a reset of a processor has failed, the method comprising the steps of:
   issuing a reset signal to the processor; and
   indicating that the reset has failed if after a first instruction fetch cycle is issued from the processor the fetched first instruction does not match a predetermined instruction.

9. A computer system, comprising:
   a processor coupled to a bus;
   circuitry for performing a processor reset including circuitry for providing a reset signal to the processor, the reset signal causing the processor to fetch a first instruction from a predetermined address;
   circuitry for determining whether the processor fails to fetch the first instruction within a predetermined period of time;
   circuitry for determining whether the first instruction is fetched from an address that matches the predetermined address; and
   circuitry for indicating that the reset has failed if the processor fails to fetch the first instruction from the predetermined address within the predetermined period of time.

10. The computer system of claim 9 wherein the circuitry for indicating that the reset has failed includes a communications device that transmits information over a communications network, the information indicating that the reset has failed.

11. The computer system of claim 9 wherein the circuitry for indicating that the reset has failed includes a light emitting device that provides a visual indication that the reset has failed.

12. The computer system of claim 9 wherein the circuitry for indicating that the reset has failed includes an audio device that provides an aural indication that the reset has failed.

13. A semiconductor logic device, comprising:
   circuitry for performing a processor reset including circuitry for providing a reset signal to a processor, the reset signal causing the processor to fetch a first instruction from a predetermined address;
   circuitry for determining whether the processor fails to fetch the first instruction within a predetermined period of time;
   circuitry for determining whether the first instruction is fetched from an address that matches the predetermined address; and
   circuitry for indicating that the reset has failed if the processor fails to fetch the first instruction from the predetermined address within the predetermined period of time.

14. The semiconductor logic device of claim 13 wherein the circuitry for indicating that the reset has failed includes an alert signal that communicates to other system devices that the reset has failed.

* * * * *

UNITED STATES PATENT AND TRADEMARK OFFICE
CERTIFICATE OF CORRECTION

PATENT NO. : 6,014,758
DATED : January 11, 2000
INVENTOR(S) : Poisner It is certified that error appears in the above-identified patent and that said Letters Patent is hereby corrected as shown below:

In column 1, at line 55, after "method" insert --and apparatus for detecting--.
In column 1, at line 59, replace "whithin" with --within--.
In column 1, at line 65, replace "black" with --block--.

Signed and Sealed this

Twenty-third Day of January, 2001

*Attest:*

Q. TODD DICKINSON

*Attesting Officer*  *Commissioner of Patents and Trademarks*